United States Patent [19]
Kim et al.

[11] Patent Number: 6,144,792
[45] Date of Patent: Nov. 7, 2000

[54] DEVICE FOR FIXING THE OPTICAL ELEMENTS OF AN OPTICAL FIBER AMPLIFIER

[75] Inventors: Tae-Ryong Kim; Mi-Young Hong; Chan-Sik Park, all of Gumi, Rep. of Korea

[73] Assignee: SamSung Electronics Co., Ltd., Suwon, Rep. of Korea

[21] Appl. No.: 08/958,211

[22] Filed: Oct. 27, 1997

[30] Foreign Application Priority Data

Oct. 25, 1996 [KR] Rep. of Korea ............ 96-48509
Feb. 11, 1997 [KR] Rep. of Korea ............ 97-3944

[51] Int. Cl.[7] .................................. G02B 6/36
[52] U.S. Cl. ............................. 385/135; 385/134
[58] Field of Search ...................... 385/134–135

[56] References Cited

U.S. PATENT DOCUMENTS

| | | | |
|---|---|---|---|
| 4,861,134 | 8/1989 | Alameel et al. | 385/135 |
| 5,146,532 | 9/1992 | Hodge | 385/136 |
| 5,167,001 | 11/1992 | Debortoli et al. | 385/135 |
| 5,323,480 | 6/1994 | Mullaney et al. | 385/135 |
| 5,329,067 | 7/1994 | Abe et al. | 174/260 |
| 5,353,367 | 10/1994 | Czosnowski et al. | 385/135 |
| 5,469,526 | 11/1995 | Rawlings | 385/135 |
| 5,515,200 | 5/1996 | Delrosso et al. | 359/341 |
| 5,596,670 | 1/1997 | Debortoli et al. | 385/135 |
| 5,633,973 | 5/1997 | Vincent et al. | 385/135 |
| 5,646,775 | 7/1997 | Delrosso et al. | 359/341 |
| 5,668,909 | 9/1997 | Mozzati | 385/134 |
| 5,870,519 | 2/1999 | Jenkins et al. | 385/135 |

FOREIGN PATENT DOCUMENTS

| | | |
|---|---|---|
| 0 595 395 | 5/1994 | European Pat. Off. . |
| 0 595 396 | 5/1994 | European Pat. Off. . |
| 2 234 087 | 1/1991 | United Kingdom . |
| 2 250 105 | 5/1992 | United Kingdom . |
| 2 254 163 | 9/1992 | United Kingdom . |

*Primary Examiner*—Rodney Bovernick
*Assistant Examiner*—Ellen E. Kim
*Attorney, Agent, or Firm*—Robert E. Bushnell, Esq.

[57] ABSTRACT

A device for fixing the optical elements of an optical fiber amplifier in a packaging box comprises a central opening provided in the packaging box for making a connection with an electronic circuit, an optical fiber holder for holding the erbium doped optical fiber around the central opening, a plurality of guide supports provided in the upper and lower sides of the optical fiber holder for holding the optical isolators, wavelength division multiplexers and optical taps, and protectors provided in the left and right sides of the optical fiber holder for holding the thermocontractile tubes.

15 Claims, 8 Drawing Sheets

DEVICE FOR FIXING THE OPTICAL ELEMENTS OF AN OPTICAL FIBER AMPLIFIER

This application makes reference to, incorporates the same herein, and claims all benefits accruing under 35 U.S.C. §119 from an application for DEVICE FOR FIXING THE OPTICAL ELEMENTS OF AN OPTICAL FIBER AMPLIFIER earlier filed in the Korean Industrial Property Office on Oct. 25, 1996 and there duly assigned Ser. No. 48509/1996 and on Feb. 11, 1997 and there duly assigned Serial No. 3944/1997.

FIELD OF THE INVENTION

The present invention concerns an optical fiber amplifier, and more particularly a device for fixing the optical elements of a double pumping erbium doped optical fiber amplifier (EDFA) in a packaging box.

DESCRIPTION OF THE RELATED ART

U.S. Pat. No. 5,668,909 for a Container for Housing Optical Components in an Active Fiber Optical Amplifier to Mozzati discloses a device for storing elements needed to amplify signals in an optical fiber. U.S. Pat. No. 5,596,670 for an Optical Fiber Cable Enclosure to Debortoli et al discloses a storage region for optical fibers. What is needed is a packaging device for an optical fiber amplifier that facilitates maintenance and replacement of the optical elements. What is also needed is a design that prevents the optical elements from being damaged during movement.

SUMMARY OF THE INVENTION

It is an object of the present invention to provide an improved device for fixing the elements of an optical fiber amplifier in predetermined positions inside a packaging box.

It is another object of the present invention to provide a device for fixing the elements of an optical fiber amplifier which facilitates maintenance and replacement of the optical elements.

It is still another object of the present invention to provide a device for fixing the elements of an optical fiber amplifier which facilitates separation of the electronic part and the optical part.

It is a further object of the present invention to provide a device for fixing the elements of an optical fiber amplifier which facilitates to arrange the optical elements and thermocontractile tubes in a packaging box.

It is further another object of the present invention to provide a device for fixing the elements of an optical fiber amplifier which prevents the optical elements and optical fiber from being damaged even during movement and vibration.

According to an embodiment of the present invention, a device for fixing the optical elements of an optical fiber amplifier in a packaging box comprises a central opening provided in the packaging box for making a connection with an electronic circuit, an optical fiber holder for holding the erbium doped optical fiber around the central opening, a plurality of guide supports provided in the upper and lower sides of the optical fiber holder for holding the optical isolators, WDMs and optical taps, and protectors provided in the left and right sides of the optical fiber holder for holding the thermocontractile tubes.

According to another embodiment of the present invention, a device for fixing the optical elements of an optical fiber amplifier in a packaging box comprises a central opening provided in the packaging box for making a connection with an electronic circuit, an optical fiber holder for holding the erbium doped optical fiber around the central opening, first guide support provided in the upper side of the optical fiber holder for holding the optical isolators, second guide support provided in one side of the first guide support for holding the optical taps and WDMs, third and fourth guide supports provided in the lower side of the optical isolators, protectors provided in the left and right sides of the optical fiber holder for holding the thermocontractile tubes, guide walls formed round along the inside walls of the packaging box to smoothly guide the optical cable containing the optical fiber, protuberances formed in the upper and lower end walls of the packaging box for prevent inadvertent detachment of the optical cable, and bosses provided in the corners of the packaging box to mount on a main housing.

The present invention will now be described more specifically with reference to the drawings attached only by way of example, where same reference numerals are used to represent same functional elements. For convenience's sake, detailed descriptions are omitted concerning conventional elements unnecessary for grasping the concept of the present invention.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Generally, an optical fiber amplifier is to amplify an optical signal, which is converted from an electrical signal, at a given distance along an optical fiber so as to compensate for the transmission loss. One of the optical fiber amplifiers widely used is a double pumping erbium doped optical fiber amplifier (EDFA), whose structure is illustrated in FIG. 1.

Figure 1:
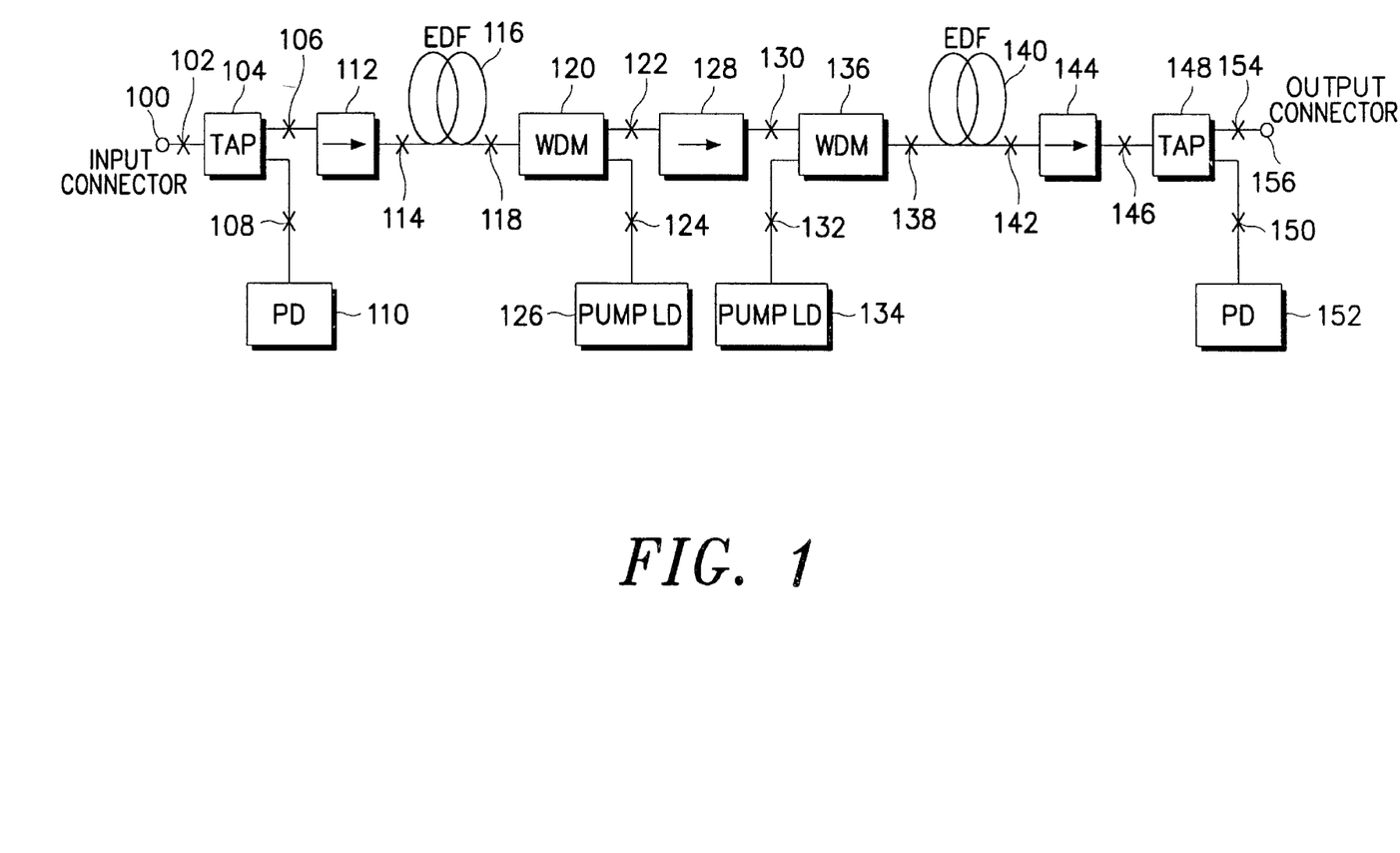
FIG. 1 is a block diagram for illustrating the optical elements arranged in a conventional double pumping erbium doped optical fiber amplifier (EDFA)

Referring to FIG. 1, the construction and the operation of the above double pumping erbium-doped optical fiber amplifier are described in the following. The input connector 100 connects the lead-in optical fiber from outside to the inner optical fiber inside of the optical fiber amplifier. The first optical tap 104 which is connected via optical fiber to the above input connector 100 splits optical signal received through the optical fiber at a fixed rate to apply the splitted signals to first photo diode 110 and to first optical isolator 112 respectively, whereby the above first photo diode 110 monitors the magnitude of the received signal, and the above first optical isolator 112 having an input end and an output end passes optical signal traveling from the input end to the output end within a fixed wavelength region and, on the contrary, blocks reverse optical signal returning to the input end, so that the above first optical isolator 112 blocks the backward flow of the ASE (amplified spontaneous emission) generated from first erbium-doped optical fiber in the rear to prevent the optical input signal from being distorted.

The optical signal outputted from first optical isolator 112 is applied to first wavelength-division multiplexer 120, and first pumping laser diode 126 connected to the output end of the above first wavelength-division multiplexer 120 supplies the light source of stimulated wavelength to first erbium-doped optical fiber 116, wherein the above first wavelength-division multiplexer 120 receives the incident optical signal having wavelength of 1550 nm and the stimulated light source having wavelength of 980 nm or 1480 nm each from different input terminals to further output to an optical fiber terminal. And the first pumping laser diode 126 is used for many power amplifiers positioned just before the sending-ends in communication means because it increases the saturation output by amplifying large-signals by means of the reverse directional ASE whose strength is relatively greater than that of the forward directional ASE in case of optical fiber amplifiers.

The output end of the above first wavelength-division multiplexer 120 is connected to second optical isolator 128 and to second wavelength-division multiplexer 136 in order. The above second optical isolator 128 performs the same function as the above first optical isolator 112, and the above second wavelength-division multiplexer 136 supplies the light source with an stimulated wavelength pumped in forward direction by second pumping laser diode 134 and the incident optical signal to second erbium-doped optical fiber 140. And in case of optical fiber amplifiers, the above second pumping laser diode 134 is used for many preamplifiers positioned just before receiving ends of communication means by utilizing the pumping light with wavelength of 980 nm in which the small-signal gain is relatively high and the noise is low.

The output-end of the above second wavelength-division multiplexer 136 applies the stimulated light source having wavelength of 980 nm and the incident optical signal having wavelength of 1550 nm to second erbium-doped optical fiber 140, whereby the above erbium-doped optical fiber 116, 140 amplifies the incident optical signal because the above optical fiber is doped with the rare-earth erbium element (atomic No. 68) which has a high absorptivity in the specific wavebands (800 nm, 980 nm, 1480 nm, etc.) and a spectrum with divergence of bandwidth of about 60 nm in the above specific wave band (1550nm).

The output-end of the above second erbium-doped optical fiber 140 is connected to third optical isolator 144 and to second optical tap 148 in order, and the output-end of the above second optical tap 148 is connected to the output optical fiber by means of the output connector 156, whereby the above third optical isolator 144 blocks the reversing optical signal reflected by/from the connecting parts of the above second optical tap 148 or the output connector 156, and the above second optical tap 148 receives optical signal from the above third optical isolator 144 to further split into an optical signal intended to be transmitted to the output optical fiber through the above output connector 156 on one hand and a monitoring optical signal for monitoring the optical output signal, and the above monitoring optical signal is monitored by second photodiode 152.

After the optical elements of the above optical fiber amplifier (input connector, optical taps, photodiodes, optical isolators, wavelength-division multiplexers, pumping laser diodes, and output connector) are connected with the respective input optical fiber and output optical fiber provided on both sides, the contact points, i.e., splicing points, are wrapped with the thermocontractile tubes (tubes that are apt to be shrunk by heat) 102, 106, 108, 114, 118, 122, 124, 130, 132, 138, 142, 146, 154, 150, or the contact points are coated with aluminum or stainless material.

The numbers of the optical elements of a double pumping erbium-doped optical fiber amplifier to be packaged are 25 including thermocontractile tubes. Accordingly in the conventional packaging method, the optical section and the electrical circuitry are installed in the packaging box the inside of which is formed like elliptical racetrack, whereby the optical isolators, wavelength division multiplexers, optical taps, and a plurality of thermocontractile tubes are each arranged around the above track without any fixing means as they are, and lastly thereafter, a sponge rubber plate is placed above the optical elements and thermocontractile tubes to fix them by pressing down from above.

However, the conventional packaging box of the optical fiber amplifier has the drawbacks in that since the above optical elements and thermocontractile tubes are arranged in the packaging box without being fixed by any fixing means, the packed optical elements are shaken and vibrated within the box when moving and turning the above optical fiber amplifier upside down, and as a result, the optical fibers each connected to the optical elements are depressed and bended, thereby resulting in deteriorating the properties of the optical elements and the entire optical fiber amplifier itself, that since the arrangement of track inside of the packaging box is leaned downwardly from the center, the packaging box is short of space for accommodating wavelength-division multiplexers, optical taps, optical isolators, and thermocontractile tubes in case of the double pumping structure, that since the optical elements are arranged around the track, the optical fibers are bended by each of the optical elements, resulting in bending losses, that since the positions of the optical elements are not fixed, the parts replacing and performance improving works are difficult when repairing, and that the productivity is deteriorated due to a lot of assembling processes because the optical elements can not be installed at speed.

Figure 2:
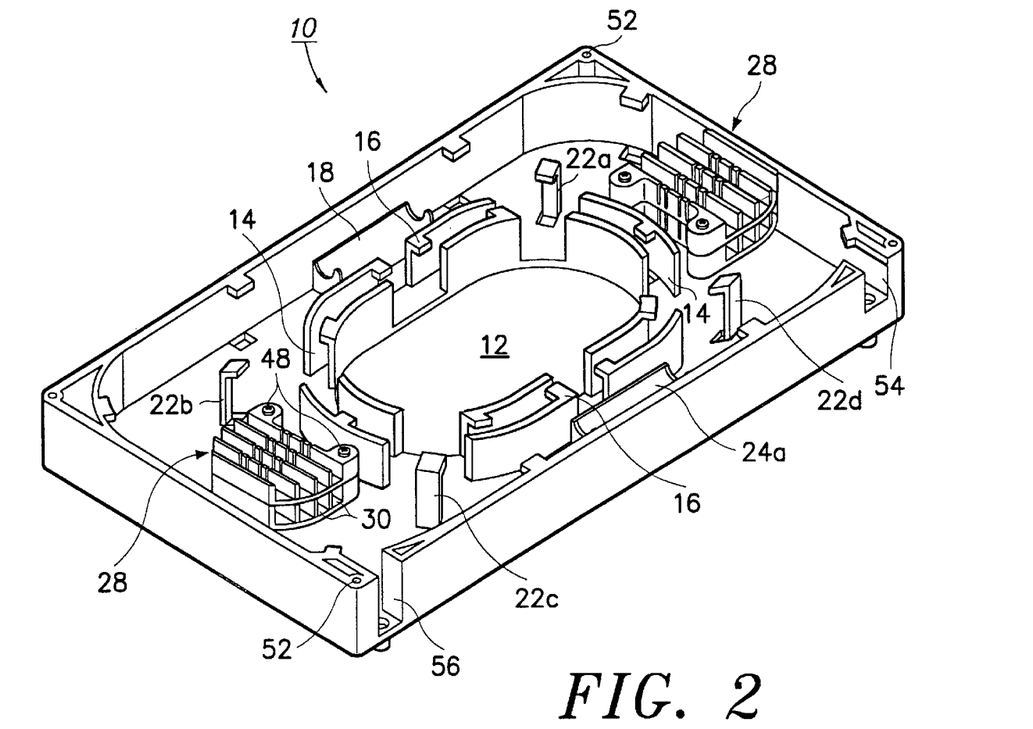
FIG. 2 is a perspective view for illustrating the structure of a packaging box to fix the optical elements according to an embodiment of the present invention.
Figure 4:
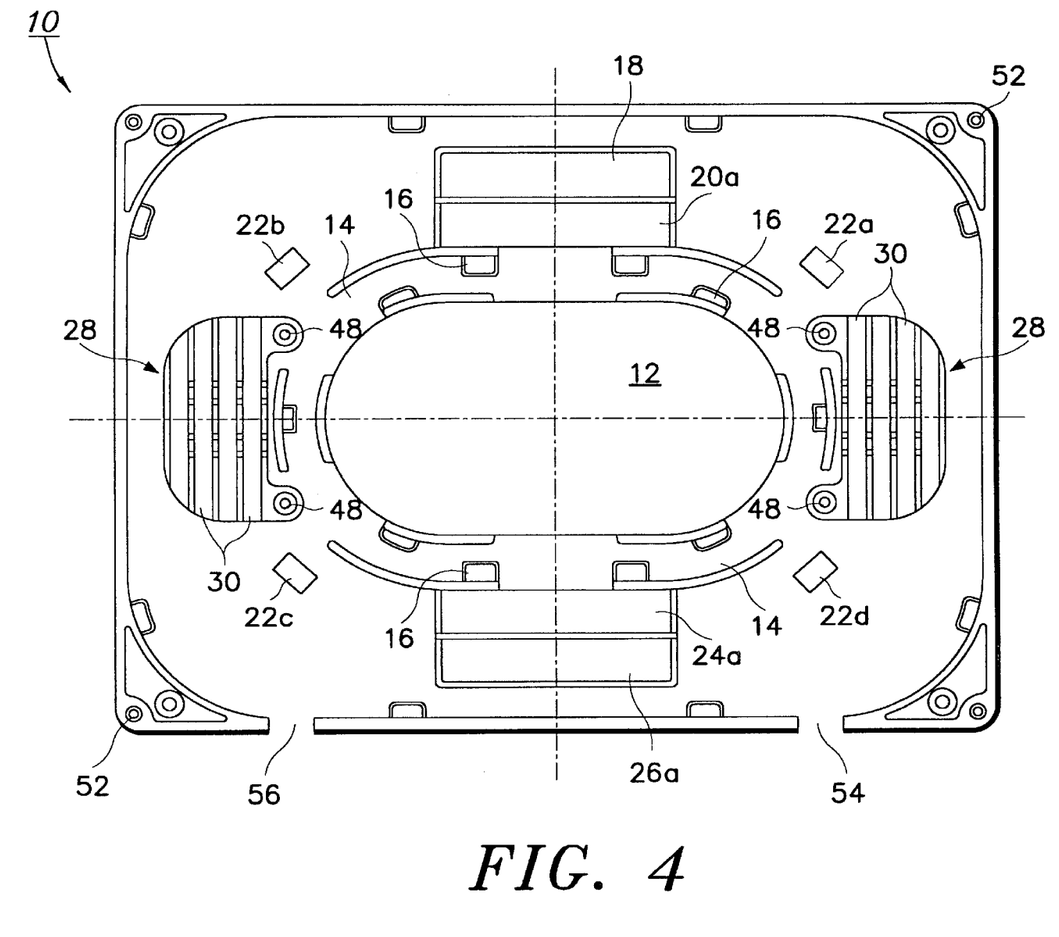
FIG. 4 is a plane view of FIG. 2.

Referring to FIGS. 2 and 4, the packaging box 10 for fixing the optical elements of the above double pumping erbium-doped optical fiber amplifier inside thereof comprises a central opening 12 provided in the center for accommodating the pumping laser diodes 126, 134 connected with the optical section and the electronic circuitry, and the monitoring connectors of the optical taps 104, 148, and an optical fiber holder 14 provided along/around the above central opening 12 for holding the above erbium-doped optical fibers 116, 140 around the above central opening in which the above optical fiber holder 14 is formed like an elliptical track in order to minimize the bending losses of the above erbium-doped optical fibers 116, 140 in the vicinity of curved surfaces when being mounted, and a plurality of fixing protuberances 16 are formed at regular intervals zigzag on the upper periphery of the above optical fiber holder 14 to support and fix the above erbium-doped optical fibers 116, 140 in position in order to prevent them from being detached from the optical fiber holder 14. The interior peripheral comers of packaging box 10 are curved as shown by reference numerals 49.

The upper side of the above optical fiber holder 14 is provided with second guide support 20a formed like a groove with a given curvature for holding and fixing second optical isolator 128, and first guide support 18 is formed like a groove with a given curvature on one side of the above second guide support 20a in order to hold and fix first optical isolator 112. The lower side of the above optical fiber holder 14 is provided with third guide support 24a formed like a groove with a given curvature for holding and fixing first and second optical taps 104, 148, and first and second wavelength-division multiplexers 120, 136, and fourth guide support 26a is formed like a groove with a given curvature on one side of the above third guide support 24a in order to hold and fix third optical isolator 144. A plurality of inverted L-shaped fixing ribs 22a, 22b, 22c, 22d are arranged around the above optical fiber holder 14 diagonally opposite to each other in order to hold and fix input-end optical fibers and output-end optical fibers projected from each of optical elements.

Figure 3:
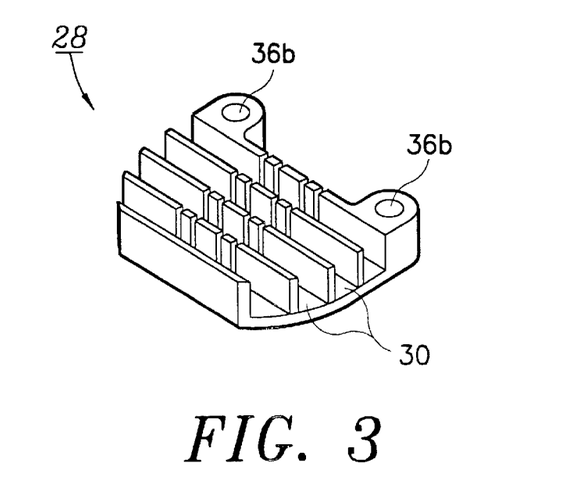
FIG. 3 is a perspective view for illustrating the shape of the protector for holding the thermocontractile tubes to protect the splicing points of the optical fibers in the packaging box as shown in FIG. 2.
Figure 5:
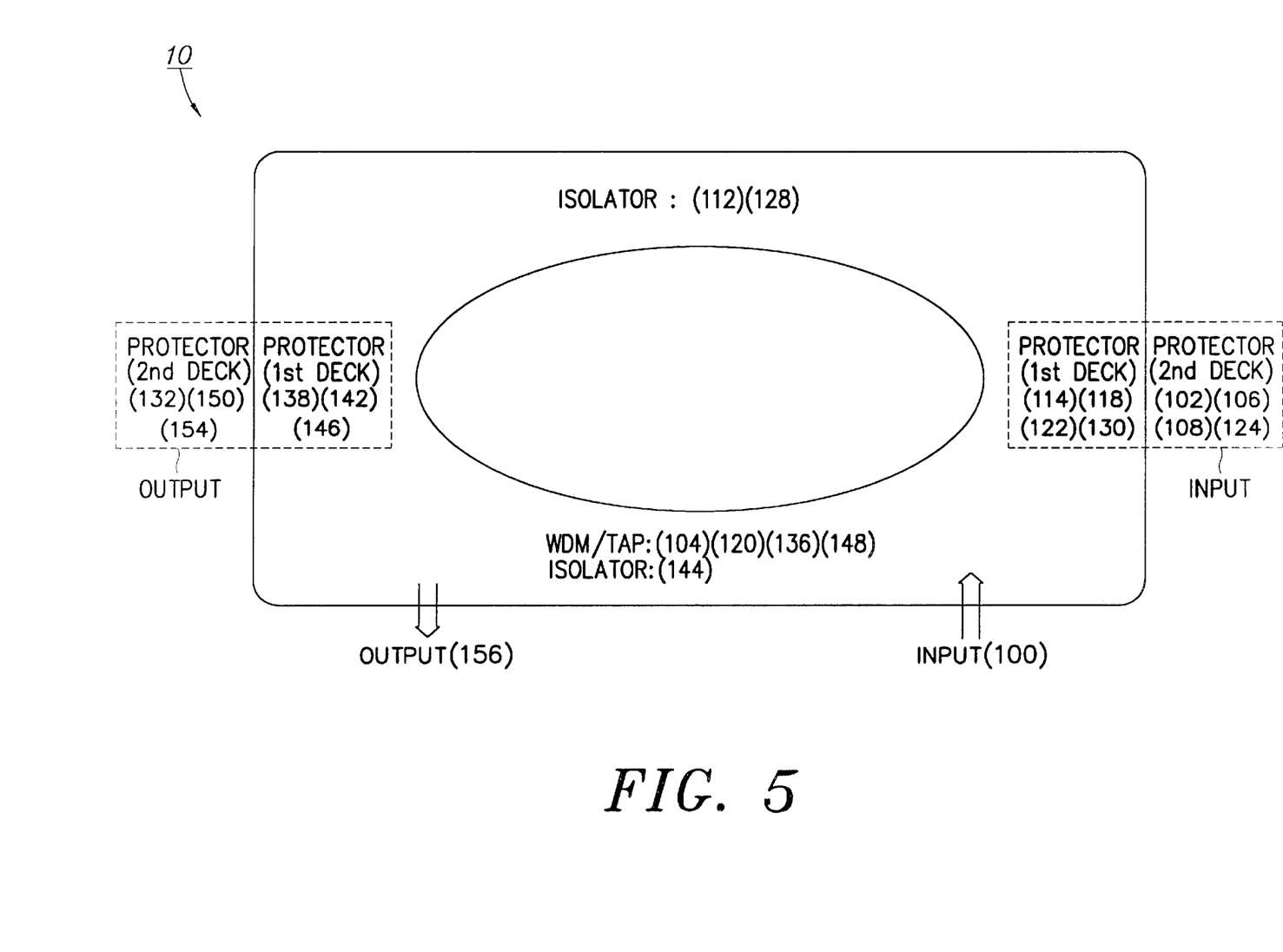
FIG. 5 is a view for illustrating the layout of the optical elements in the packaging box as shown in FIG. 1.
Figure 6:
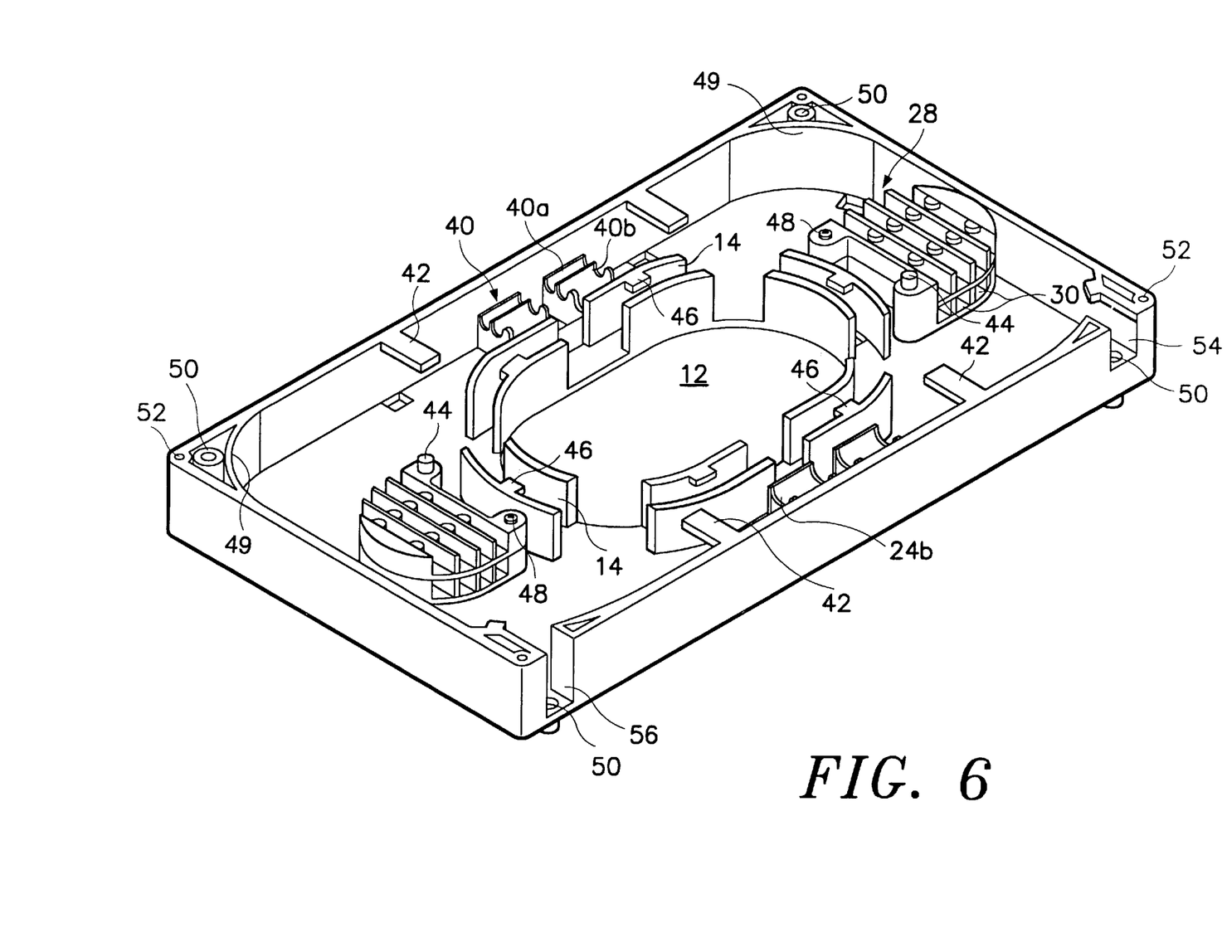
FIG. 6 is a perspective view for illustrating the structure of a packaging box to fix the optical elements according to another embodiment of the present invention.

Referring to FIG. 3, in order to support and fix a plurality of thermocontractile tubes, the protectors 28 provided with a plurality of fixing supports 30 formed like grooves are arranged superposed by two (first and second) decks in each of the left and right sides of the above optical fiber holder 14 and fastened onto the box by means of screws 48. In other words, the protector 28 provided on first deck in the left side of the optical fiber holder 14 holds the above thermocontractile tubes 138, 142, 146, and the protector 28 on second deck holds the thermocontractile tubes 132, 150, 154 as shown in FIG. 5. Likewise, the protector 28 provided on first deck in the right side of the above optical fiber holder 14 holds the thermocontractile tubes 114, 118, 122, 130, and the protector 28 on second deck holds the thermocontractile tubes 102, 106, 108, 124.

Instead, in case of the optical fiber amplifier in which the input- and output-end optical fibers of optical elements are simply spliced together and then, the splicing points are coated with aluminum or stainless material without utilizing thermocontractile tubes, the above input- and output-end optical fibers of optical elements may be mounted and fixed on the above fixing ribs 22a, 22b, 22c, 22d without necessitating the protectors 28 to be provided in the left and right sides.

Four comers of the above packaging box 10 are provided with the cover fastening holes 52 through which a protect cover is screwed down tight onto the packaging box in order to protect the optical elements from the external environment after packaging. Four comers of the above packaging box 10 are provided with the cover fastening holes 52 through which a protect cover is screwed down tight onto the packaging box 10 in order to protect the optical elements from the external environment after packaging. Further, the underside of the above packaging box 10 is provided with an optical fiber lead-in path 54 on one side and an optical fiber lead-out path 56 on another side respectively.

Now, the method for packaging the above double pumping erbium-doped optical fiber amplifier in the packaging box of the present invention is described in the following.

After preparing a layout arranging all the optical elements by dividing into input-ends and output-ends and defining the specified disposition spaces of the optical elements as shown in FIG. 5, the optical elements are arranged and fixed on the fixing board (optical fiber holder, protectors, fixing ribs, etc.) within the above packaging box 10 according to the above layout (FIG. 5), and the above input-ends optical fibers and output-ends optical fibers are spliced together respectively. Thereafter, the above thermocontractile tubes 102, 106, 108, 114, 118, 122, 124, 130, 132, 138, 142, 146, 154, 150 wrapping each of the splicing points for protection thereof are fixed in the protectors 28, so that the packaging process of the above optical fiber amplifier is completed.

Referring to FIGS. 6 and 8A–8C, the packaging box 10 of the present invention for accommodating and fixing the optical elements of the above double pumping erbium-doped optical fiber amplifier is provided in the center with a central opening 12 for accommodating the pumping laser diodes 126, 134 connected with the optical section and the electronic circuitry, and the monitoring connectors of the optical taps 104, 148, and further provided with an optical fiber holder 14 formed around/along the above central opening 12 for holding the above erbium-doped optical fibers 116, 140 in which the above optical fiber holder 14 is formed like an elliptical track in order to minimize the bending losses of the above erbium-doped optical fibers 116, 140 in the vicinity of curved surfaces when being mounted, and six fixing protuberances 16 are formed at regular intervals on the upper periphery of the above optical fiber holder 14 to support and fix the above erbium-doped optical fibers 116, 140 in position in order to prevent them from being detached upward from the optical fiber holder 14.

The upper side of the above optical fiber holder 14 is provided with second guide support 20b formed like a groove with a given curvature for holding and fixing third optical isolator 144. Further, second guide support 20a formed like a groove with a given curvature is provided on one side of the above second guide support 20b in order to hold and fix second optical isolator 128, and a fixing support 40 formed like grooves with a given curvature is provided on one side of the above second guide support 20a in order to hold and fix first and second optical taps 104, 148 and first and second wavelength-division multiplexers 120, 136. The above fixing support 40 consists of first fixing support 40a for holding the above first and second optical taps 104, 148, and second fixing support 40b for holding the above first and second wavelength-division multiplexers 120, 136, each being formed by maintaining separate curvature, whereby the optical fibers packaged in first and second fixing supports may be different depending on the packaging methods.

Further, third guide support 24b formed like a groove with a given curvature for holding the above first optical isolator 112 is provided in the lower part of the above optical fiber holder 14, and fourth guide support 26b formed like a groove with a given curvature for holding the above second optical isolator 128 is provided on one side of the above third guide support 24b.

Figure 7:
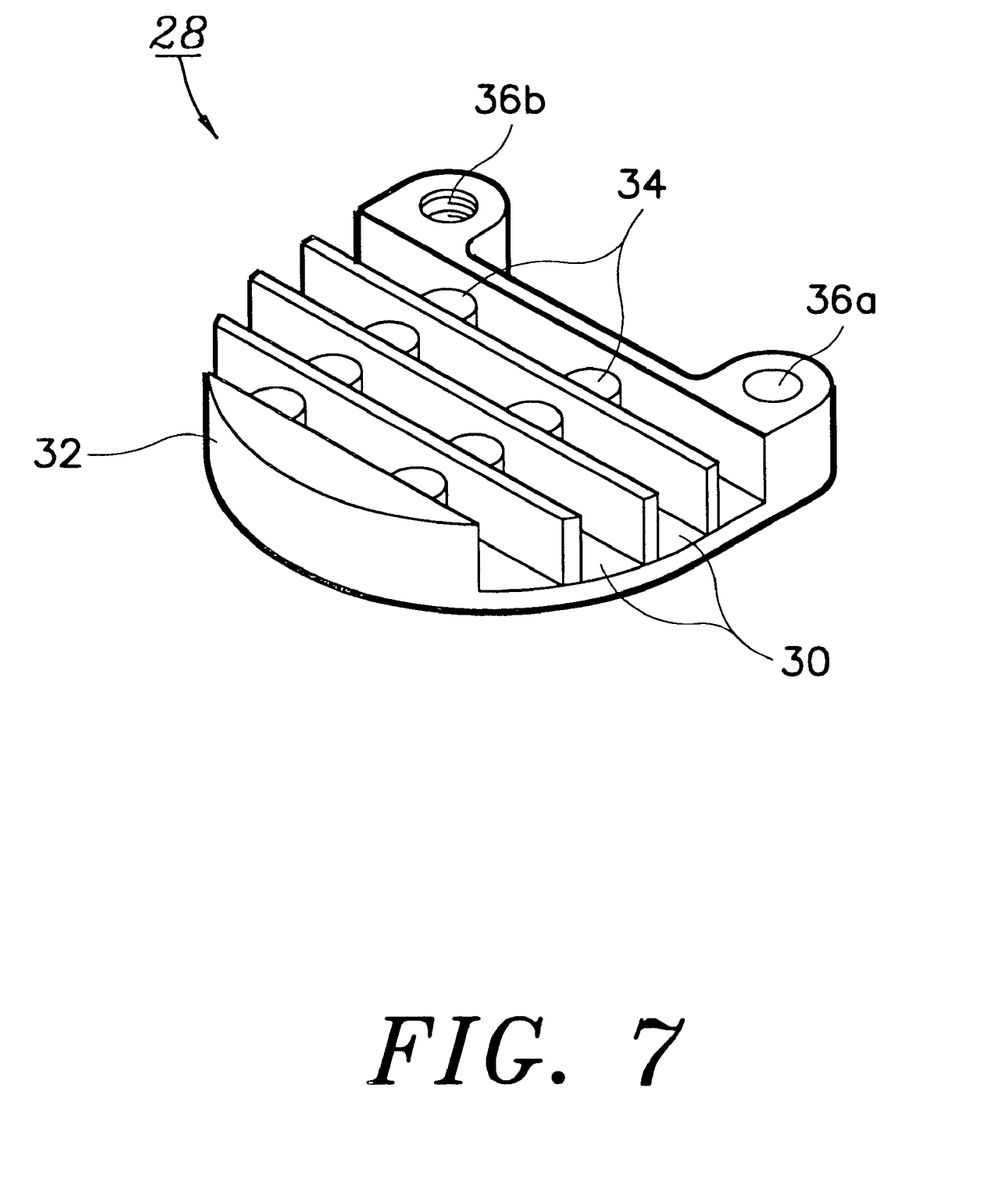
FIG. 7 is a perspective view for illustrating the shape of the protector for holding the thermocontractile tubes to protect the splicing points of the optical fibers in the packaging box as shown in FIG. 6.
Figures 8A, 8B, 8C:
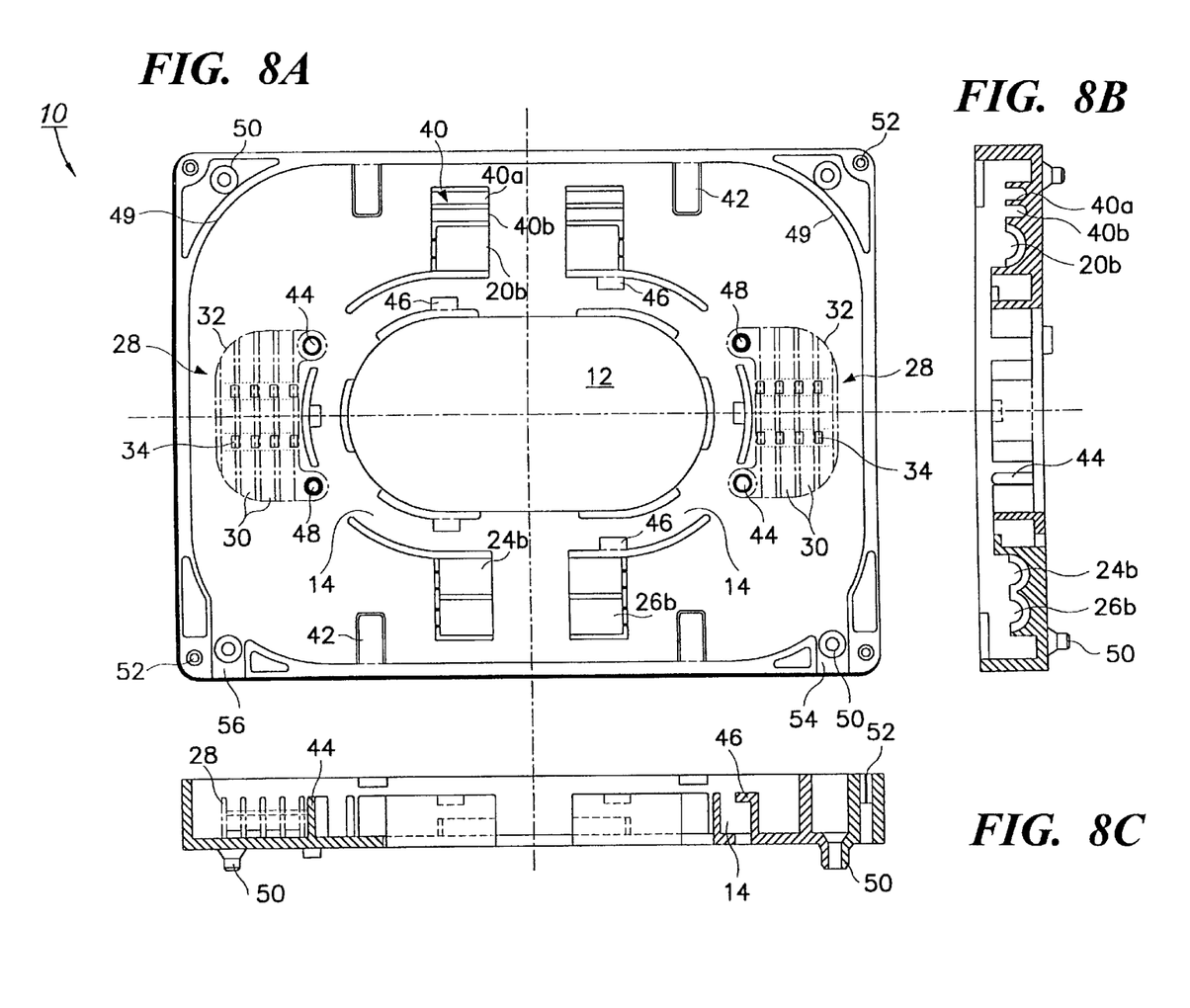
FIGS. 8A–8C together form a plane view of FIG. 6.

Referring to FIG. 7, in order to support and fix a plurality of thermocontractile tubes, the protectors 28 provided with a plurality of fixing supports 30 formed like grooves are arranged superposed by two (first and second) decks in each of the left and right sides of the above optical fiber holder 14 and fastened onto the box by means of screws 48. In other words, referring to FIG. 9, the protector 28 provided on first deck in the left side of the optical fiber holder 14 holds the above thermocontractile tubes 138, 142, 146, and the protector 28 on second deck holds the thermocontractile tubes 132, 150, 154. Likewise, the protector 28 provided on first deck in the right side of the above optical fiber holder 14 holds the thermocontractile tubes 114, 118, 122, 130, and the protector 28 on second deck holds the thermocontractile tubes 102, 106, 108, 124. The above protectors 28 are fitted onto the guide bosses 44 provided on the inside bottom of the above packaging box 10 to be positioned firmly, being protected against external impact and prevented from being detached. In order to maintain the curvature of the optical fibers at a specified angle to be suited to the packaging path, the guide roundings 32 are formed round on the outer periphery of the above protectors 28, and the resilient protuberances 34 are formed at regular intervals on the top of the above fixing supports 30 in order to resiliently hold the thermocontractile tubes.

In order to prevent the above optical fibers from being detached upwardly when winding them at a given curvature in the packaging box, four barring protuberances 42 are formed inwardly from the upper and lower edges of the packaging box 10. In order to guide the optical fibers along/around the inner wall of the packaging box without damaging the optical fibers, the curved guide walls 58 are formed inside of the corners, and four fixing bosses 50 are provided in the four corners of the packaging box 10 to mount and fix the packaging box 10 on the main housing (not shown). In order to protect the optical elements from the external environment after packaging, the cover fastening holes 52 are formed on the outermost corners, whereby a protect cover (not shown) is screwed down tight onto the packaging box 10 by means of the above cover fastening holes 52. Further, the underside of the above packaging box 10 is provided with an optical fiber lead-in path 54 on one side and an optical fiber lead-out path 56 on another side respectively.

Figure 9:
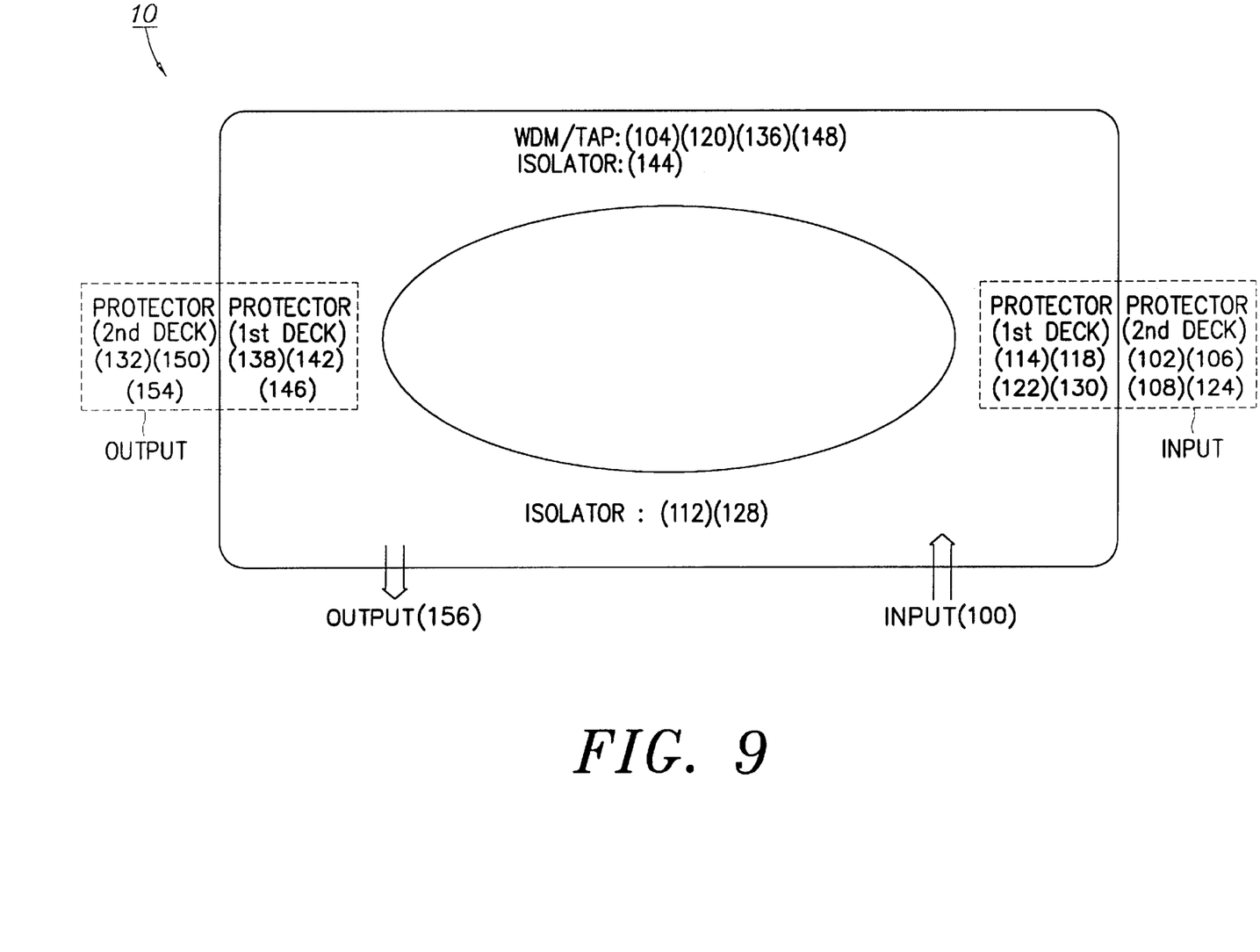
FIG. 9 is a view for illustrating the layout of the optical elements in the packaging box as shown in FIG. 6.

According to the above construction, a method for packaging the double pumping erbium-doped optical fiber amplifier in the above packaging box is described in the following. After preparing a layout arranging all the optical elements in the above packaging box 10 as illustrated in FIG. 9, the above optical elements are spliced according to the arrangement order as shown in FIG. 9 and arranged and fixed on the fixing board (optical fiber holder, fixing supports, guide supports, etc.) within the above packaging box 10 according to the above layout. And then, the above thermocontractile tubes wrapping each of the splicing points for protection thereof are fixed in the protectors 28, so that the packaging process of the above optical fiber amplifier is completed.

As described above, A device for fixing the optical elements of an optical fiber amplifier in a packaging box of the present invention has the advantages in that not only optical elements can be efficiently packaged during the production process, but also the optical section of the optical fiber amplifier can be miniaturized, so that the packaging process can be performed at high speed, that optical elements can be stably fixed in the packaging box so as to protect optical elements and optical fibers against external vibrations and impacts, that the positions of optical elements on input- and output-ends within the packaging box can be standardized to be preset, which facilitates parts replacements when repairing.

What is claimed is:

1. A packaging device for fixing optical elements, comprising:

a central aperture provided in said packaging device;

an optical fiber holder around said central aperture, said optical fiber holder is shaped as an elliptical track having an inner sidewall and an outer sidewall to prevent the curving loss of an optical signal transmitted through an optical fiber wound around said elliptical track;

a plurality of guide supports provided at opposite sides of said optical fiber holder, each of said plurality of guide supports having a rectangular structure made of four sidewalls, wherein a top edge of two of said four sidewalls are curved;

a plurality of protectors provided at opposite sides of said optical fiber holder, each protector having a plurality of channels adjacent to each other; and protuberances, in the form of overhangs, projecting from said inner sidewall and said outer sidewall.

2. A device as defined in claim 1, wherein each of said plurality of protectors are stacked on top of each other by two with a plurality of channels.

3. A device as defined in claim 1, wherein said plurality of guide supports are arranged by two in each of said upper and lower sides of said optical fiber holder with a given curvature to stably support said optical isolators, wavelength division multiplexers and optical taps.

4. A packaging device for attaching optical elements, comprising: a central aperture provided in said packaging device;

an optical fiber holder extending around said central aperture;

a plurality of guide supports provided in upper and lower sides of said optical fiber holder at opposite sides of said optical fiber holder, each of said plurality of guide supports having a rectangular structure made of four sidewalls, wherein a top edge of two of said four sidewalls are curved;

a plurality of protectors provided in left and right sides of said optical fiber holder at opposite sides of said optical fiber holder, each protector having a plurality of channels adjacent to each other; and a plurality of fixing ribs arranged around said optical fiber holder, wherein said fixing ribs are inverted 'L'-shaped fixing ribs located to position spliced ends of optical fibers connecting to optical isolators, wavelength division multiplexers and optical taps.

5. A packaging device for attaching optical elements, comprising:

a central opening aperture provided in said packaging device for making a connection with an electronic circuit;

an optical fiber holder for holding an optical fiber positioned around said central opening;

a first guide support provided an upper side of said optical fiber holder, said first guide support having a rectangular structure made of four sidewalls, wherein a top edge of two of said four sidewalls are curved;

a second guide support provided in one side of said first guide support, said second guide support having a rectangular structure made of four sidewalls, wherein a top edge of two of said four sidewalls are curved for holding optical taps and wavelength division multiplexers;

third and fourth guide supports provided in a lower side of said optical fiber holder, said third and fourth guide supports each having a rectangular structure made of four sidewalls, wherein a top edge of two of said four sidewalls are curved;

a plurality of protectors provided in left and right sides of said optical fiber holder, each protector having a plurality of channels adjacent to each other;

guide walls formed round along inside walls of said optical fiber holder to smoothly guide an optical cable containing said optical fiber;

protuberances formed in upper and lower sides of said optical fiber holder, said protuberances being in the form of overhangs projecting inward over an optical track bounded by said guide walls of said optical fiber holder, said protuberances connected to said guide walls of said optical fiber holder and perpendicular to said guide walls; and bosses provided in corners of said packaging device to mount on a main housing.

6. A device as defined in claim 5, wherein said optical fiber holder is shaped like an elliptical track to prevent curving loss of an optical signal transmitted through said optical fiber wound around said elliptical track.

7. A device as defined in claim 6, wherein said optical fiber holder is provided with a plurality of fixing protuberances at a constant interval to prevent said optical fiber from being detached from said optical fiber holder.

8. A device as defined in claim 5, wherein said optical fiber holder is provided with guide bosses to prevent inadvertent detachment of said protectors.

9. A device as defined in claim 5, wherein said second guide support comprises of a first and a second fixing part to separately hold said optical taps and said wavelength division multiplexers.

10. A device as defined in claim 5, wherein said protectors are provided with upper resilient protuberances for resiliently holding said thermocontractile tubes.

11. A device as defined in claim 10, wherein outer perimeters of said protectors are formed round to smoothly guide said optical fiber.

12. The packaging device of claim 5, further comprising a plurality of inverted 'L'-shaped fixing ribs arranged around said optical fiber holder in order to hold and fix input-end optical fibers and output-end optical fibers projected from each of said optical elements.

13. The packaging device of claim 5, further comprising four barring protuberances formed inwardly from said upper side and said lower side of said packaging box.

14. The packaging device of claim 5, wherein said protector contains guide roundings formed round an outer periphery of said protectors.

15. The packaging device of claim 5, wherein each channel of said protector comprises resilient protuberances to pinch or narrow said channel in order to resiliently hold said thermocontractile tubes.

* * * * *